July 20, 1965  R. C. JOINER ETAL  3,195,662
WEIGHING OF PARTICULATE MATERIALS
Filed July 17, 1963  4 Sheets-Sheet 1
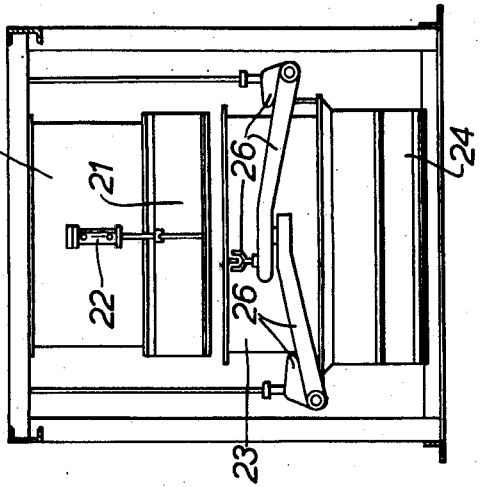
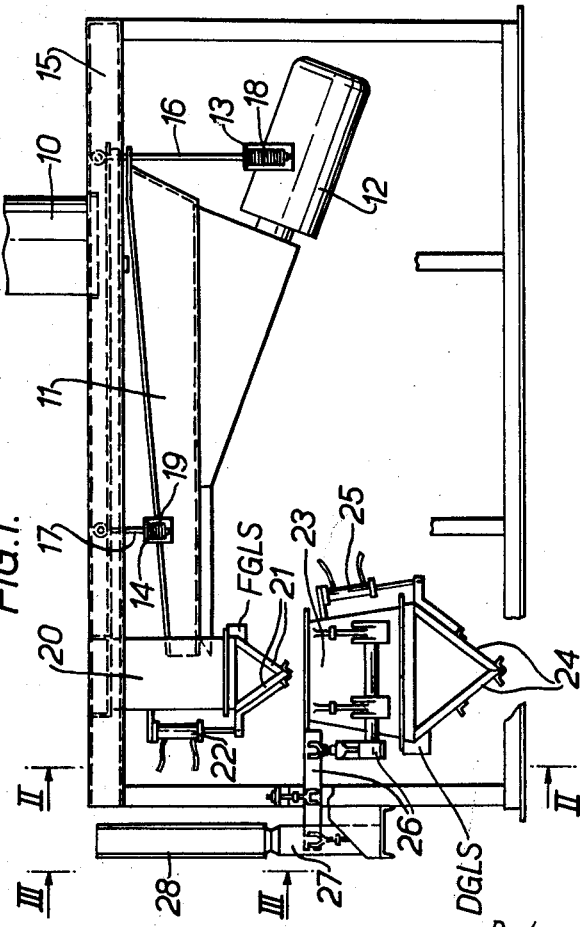
INVENTORS
Robert C. Joiner
Ambrose T. Upfold
By Stevens, Davis, Miller + Mosher
ATTORNEYS July 20, 1965  R. C. JOINER ETAL  3,195,662
WEIGHING OF PARTICULATE MATERIALS
Filed July 17, 1963  4 Sheets-Sheet 2
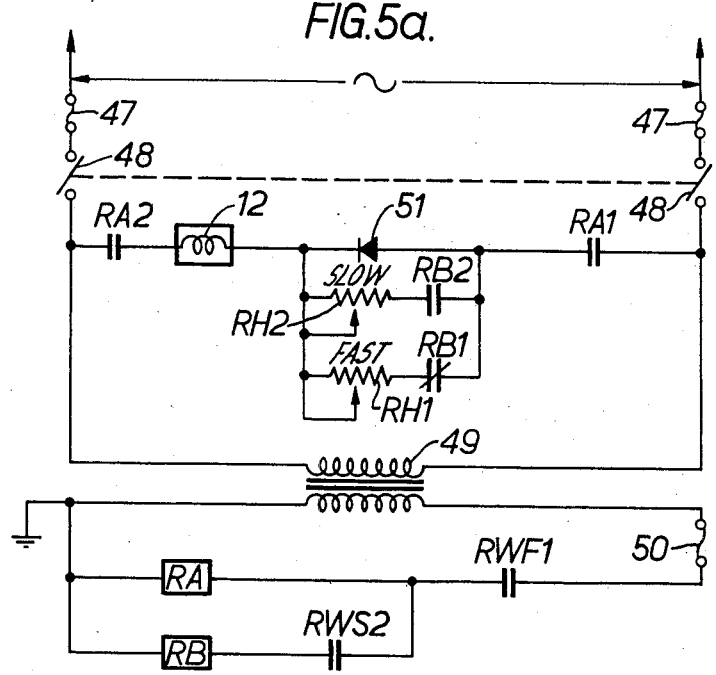
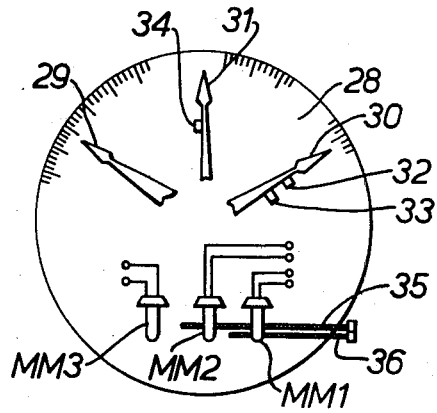
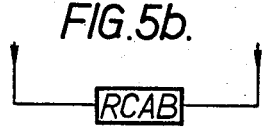
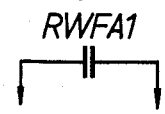
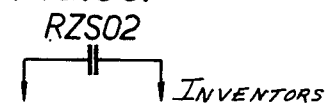

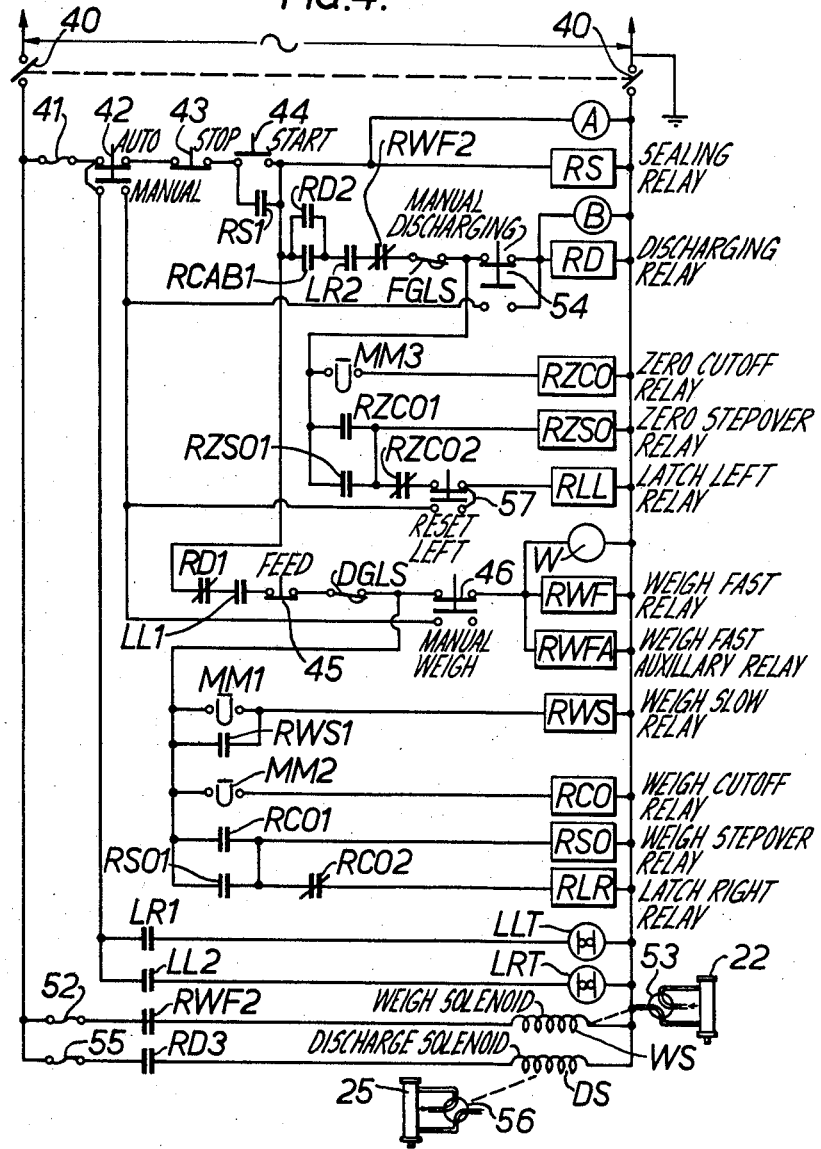

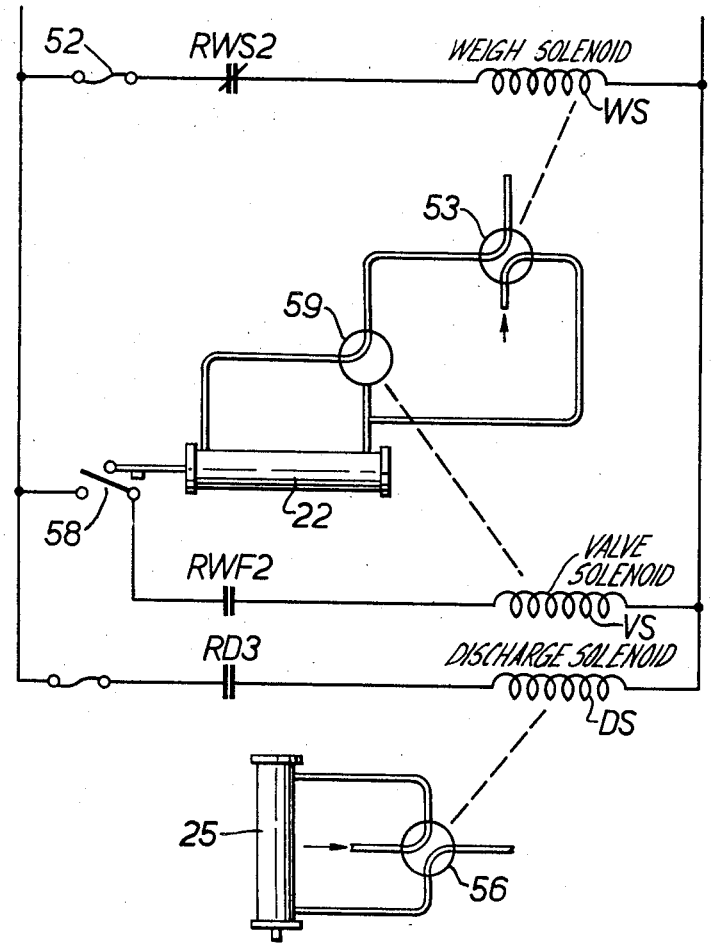

United States Patent Office 3,195,662
Patented July 20, 1965

3,195,662
WEIGHING OF PARTICULATE MATERIALS
Robert C. Joiner and Ambrose T. Upfold, Sarnia, Ontario,
Canada, assignors to Polymer Corporation Limited,
Sarnia, Ontario, Canada, a corporation
Filed July 17, 1963, Ser. No. 295,738
Claims priority, application Canada, July 25, 1962,
854,539
7 Claims. (Cl. 177—81)

This invention relates to the weighing and handling during weighing of batches of particulate material, and is especially useful when dealing with materials that are tacky, or for some other reason are inclined to lump together or adhere to the weighing equipment.

The apparatus to be described below has been developed particularly for the weighing of batches of rubber crumb. Crumb is the term given to the small pellets of rubber that are received at the discharge end of some plants manufacturing synthetic rubber and like products. Although the particular dimensions are in no sense critical to the invention, such pellets should be small (say ¼ inch) and of uniform size for maximum weighing accuracy.

On receiving such pellets it is convenient to make them up into batches of a given weight, for bagging and subsequent transportation to the plant where they are to be used. In the past, problems have been experienced in achieving adequate accuracy in the weight of such batches. This has been due largely to difficulty experienced in accurately cutting off at exactly the correct moment the supply of such pellets to the hopper in which each batch is to be weighed. If reasonably close tolerances are to be achieved this must be done as soon as the required weight is reached, with a minimum of delay. Errors are aggravated by the tendency of rubber pellets to stick to each other and form lumps. The weight of a lump may be quite large in comparison with the desired tolerance in the weight of the batch. One lump too many reaching the hopper just before the supply is cut off by scales that have detected the desired weight, can thus represent a substantial error.

It must be appreciated that it is essential for economic reasons that such batch weighing operations be carried out rapidly as well as accurately. Typically, only about 20 seconds may be available for the weighing of a 70 pound batch at the end of a supply line. Thus no time is available for the making of fine adjustments, manual corrections or the like.

The desire to achieve improved accuracy in the weighing of each batch is not only to ensure that the customer receives a correct overall weight. This fact can be and normally is checked by a subsequent weighing operation of a plurality of batches once in bags. Accuracy of weight of each batch is most convenient to the user because it enables him in subsequent processing to know with assurance the weight of rubber that is entering his operation. He can estimate the weight of rubber accurately merely by counting the batches.

It is the primary object of the present invention to provide apparatus for accurately weighing a batch of pellets of rubber or other particulate material, especially particulate material that tends to be tacky or to agglomerate into lumps for some other reason.

It is a further object of the invention to achieve improved accuracy in such a weighing operation combined with automatic and rapid operation suitable for use at the end of a conveyor line by which the material is transported in a continuous stream from a manufacturing or processing plant.

An example of apparatus constructed according to the present invention is illustrated diagrammatically in the accompanying drawings. It is to be understood that this illustration is by way of example only, and that the broad scope of the invention is limited only by the appended claims.

In the drawings:
FIGURE 1 is a side elevation view of the apparatus;
FIGURE 2 is a section on the line II—II in FIGURE 1;
FIGURE 3 is a view on the line III—III in FIGURE 1 with certain parts removed to illustrate interior mechanisms;
FIGURE 4 is the main part of the operating circuit;
FIGURE 5a is a second part of the operating circuit;
FIGURES 5b to 5e are further fragmentary portions of the operating circuit; and
FIGURE 6 illustrates a modified circuit and mechanism.

Reference will first be made to FIGURES 1 and 2 which show a supply chute 10 by which the material to be weighed is received from the manufacturing plant. The material falls from the chute 10 into a trough 11 which together with an electromagnet 12 forms a vibratory feeder of known type suspended on brackets 13 and 14 from a machine frame 15 by rods 16 and 17, springs 18 and 19 being interposed to allow the feeder to vibrate when the electromagnet 12 is energized. As a result the material is fed along the trough 11 from right to left as seen in FIGURE 1 in accordance with the known manner of operation of such feeders.

At its discharge end, the trough 11 projects into the upper part of a supply hopper 20, the lower surfaces of which are defined by a pair of movable doors 21 operated between open and closed position by a double acting pneumatic cylinder 22. A limit switch FGLS is closed when and only when doors 21 are closed. The supply hopper 20 is situated immediately above a weigh hopper 23 which is also provided with bottom doors 24 operably between open and closed positions by a double-acting pneumatic cylinder 25. A limit switch DGLS is closed when and only when doors 24 are closed. The weigh hopper 23 is mounted on a conventional weighing mechanism which is shown generally at 26 but is not otherwise described in detail. Mechanism 26 is connected to a conventional scale mechanism 27 having a circular face 28 of the type in which an indicator 29 (FIGURE 3) travels around the periphery of the face 28 to indicate the weight of material under observation, that is the weight of material in the weigh hopper 23 after suitable allowance has been made for the weight of the hopper 23 itself.

For the purposes of the present invention, the scale face 28 has been modified by being provided with two further indicators 30 and 31, each of which can be manually set a required circumferential spacing from the weight indicator 29. Such settings will depend upon the weight of batch required.

The weigh cut-off indicator 30 carries two small permanent magnets 32 and 33 arranged for cooperation respectively with mercury switches MM1 and MM2. The zero cut-off indicator 31 carries a small magnet 34 for cooperation with a third mercury switch MM3. The parts are so disposed by the initial settings that the magnet 34 of the zero cut-off indicator 31 lies directly above the mercury switch MM3 when the weight indicator 29 indicates zero net weight, that is to say when the weigh hopper 23 is empty. The position of the weigh cut-off indicator 30 will be adjusted so that its magnet 33 will lie above and hence actuate the mercury switch MM2 when the pointers have moved around the scale a distance corresponding to the addition to the weigh hopper 23 of the weight of material required for each batch. The other magnet 32 of the weigh cut-off indicator 30 will be arranged to lie above and actuate the mercury switch MM1 as the indicator 30 closely approaches switch MM2, that is to say when the amount of material in the weigh hopper 23 is within a few pounds of the total required. In addition to being able to adjust the circumferential position of weigh cut-off indicator 30 in relation to the basic indicator 29 to set the batch weight, switches MM1 and MM2 can be moved transversely of the scale face 28 by manually operable screw mechanisms 35 and 36. This provides for further fine adjustment, and in particular permits adjustment of the closeness to the desired weight that must be achieved before the preliminary mercury switch MM1 is actuated.

FIGURES 4 and 5a to e show the operating circuits. Referring first to FIGURE 4, power is supplied through main on-off switch 40 to flow through fuse 41; cycle switch 42; stop switch 43 and start switch 44, to energize a sealing relay RS and an indicating lamp A, assuming cycle switch 42 to be in AUTO position. Sealing relay RS closes its contacts RS1 to short the start switch 44 and hold the relay RS closed. The contacts RS1 also energize a weigh fast relay RWF through normally closed contacts RD1; normally open contacts LL1 which will have been closed from the previous cycle as will later be explained; feed switch 45; limit switch DGLS and manual weigh switch 46, which will normally be in the upper position shown when automatic weighing is desired. Simultaneously weighing indicator lamp W is lit, and a weigh fast auxiliary relay RWFA is energized.

Attention should now be directed to FIGURE 5a which shows a further main supply extending through fuses 47 and main on-off switch 48 to a transformer 49, the secondary of which includes a fuse 50, contacts RWF1 of the weigh fast relay (which are now closed) and an actuating relay RA. Relay RA is thus energised and closes its contacts RA1 and RA2 in a circuit from switch 48 through a rectifier 51 and the electromagnet 12 of the vibratory feeder. In addition to the pulsating direct current that will be supplied by the rectifier 51, the electromagnet 12 will receive alternating current through the normally closed contacts RB1 of a relay RB. A rheostat RH1 in series with this alternating current will be set initially to provide the desired fast rate of material feed.

Returning to FIGURE 4, it will be observed that further contacts RWF2 of the energised weigh fast relay RWF will serve to connect power through fuse 52 to a weigh solenoid WS which is mechanically connected to a four-way valve 53 supplying air to the pneumatic cylinder 22 controlling operation of the supply hopper doors 21. Energization of the weigh solenoid WS will move valve 53 to operate cylinder 22 to open the doors 21. Since the doors 24 of the weigh hopper 23 will be closed (for reasons that will become apparent later) the material which is now fed along the trough 11 by virtue of energization of the electromagnet 12 will pass through the supply hopper 20 into the weigh hopper 23 at a fast rate of feed. This charging of the weigh hopper 23 will continue until the weight of material therein is sufficient to bring the magnet 32 on the weigh cut-off indicator 30 into position over the first mercury switch MM1 (FIGURE 3). The electrical connections of this switch are shown in FIGURE 4 and it will be observed that its closure by the magnet 32, will act to energize a weigh slow relay RWS. This relay RWS has self-holding contacts RWS1 so that it remains closed. It also has a second pair of contacts RWS2 which appear in FIGURE 5a and act in series with contacts RWF1 to energize the relay RB to close its contacts RB2 and open its contacts RB1. This shifts a second series rheostat RH2 into the alternating current circuit with electromagnet 12 in place of rheostat RH1, rheostat RH2 having been set to provide a desired rate of slow feed of material along the trough 11. Thus, as the weight of material in the hopper 23 approaches within a few pounds of the desired weight, the rate of feed is sharply reduced.

When the exact desired weight is reached, magnet 33 on the weigh cut-off indicator 30 actuates the second mercury switch MM2 which, as appears from FIGURE 4, energizes a weigh cut-off relay RCO. This relay has a pair of normally open contacts RCO1 and a pair of normally closed contacts RCO2 which together form a series circuit with a latch right relay RLR. Relay RCO is constructed so that its contacts RCO1 close before its contacts RCO2 open. Latch right relay RLR is thus pulsed and latched in. By this action, it closes its contacts LR1 which energize a trip mechanism LLT of a latch left relay RLL which has until this time been latched in for reasons which will also appear later. The contacts LL1 of this relay were relied upon to establish the initial circuit to weigh fast relay RWF.

Contacts RCO1 of the weigh cut-off relay RCO are also connected in series with a weigh step-over relay RSO which is accordingly energised to close its own self-holding contacts RSO1.

The tripping of left latch relay RLL opens contacts LL1 to de-energize relay RWF and open its contacts RWF1 and RWF2. Opening of contacts RWF1 (FIGURE 5a) de-energizes relays RA and RB to cut off the supply of all power to the electromagnet 12 and hence stop the feeding of material along the trough 11; and opening of contacts RWF2 de-energizes the weigh solenoid WS. As a result of this latter de-energization, the four-way valve 53 returns under spring action to its opposite position in which the air cylinder 22 is energized in the sense to close the doors 21 of the supply hopper 20. This action occurs quickly enough normally to catch any material that has already left the lip of trough 11 when the correct weight is signalled by mercury switch MM2 or which subsequently drops off the end of such lip. To achieve maximum effectiveness in this regard, the doors 21 of the supply hopper 20 should be positioned as close as possible to the upper edge of the weigh hopper 23.

Opening of contacts LL1 also de-energizes relays RWFA, RWS, RCO and RSO.

The correct weight of material is now waiting in the weight hopper 23 for dispatch to the packaging machine. If this machine is ready to receive a batch, as it normally will be, it transmits a signal to energize a can-accept-batch relay RCAB (FIGURE 5b) which closes its contacts RCAB1 in the circuit of FIGURE 4. These contacts RCAB1 are in series with contacts LR2 of the latch right relay RLR, which will now be closed, and with contacts RWF2 which are also closed now that the weigh fast relay RWF is de-energized. Provided doors 21 are properly closed limit switch FGLS will now be closed to complete this circuit through switch 54 (which will normally be in the upper position shown when automatic discharging is required) to energize a discharging relay RD and an indicating lamp B.

Dicharging relay RD has a pair of self-holding contacts RD2 in parallel with contacts RCAB1 which thus retains the relay RD energised. This relay also controls normally closed contacts RD1 in the circuit energizing the weigh fast relay RWF. Energization of discharging relay RD hence opens contacts RD1 to provide a further break in the circuit to the weigh fast relay RWF. (Contacts LL1 are already open.) The principal effect of energization of the discharging relay RD is to close its contacts RD3 which supply power through fuse 55 to a discharge solenoid DS which is mechanically linked to a four-way valve 56 controlling passage of pressure air to the cylinder 25 controlling the discharge doors 24 of the weigh hopper 23. In this manner these doors are opened to discharge the weighed batch of material. Opening of doors 24 opened their limit switch DGLS to provide yet another break in the circuit to the weigh fast relay RWF.

The weigh hopper doors 24 having opened and discharged the weighed material to a baling machine or other mechanism, the weight detected by the scale should again return to net zero. The zero cut-off indicator 31 will thus bring its magnet 34 into operating relationship with the third mercury switch MM3 (FIGURE 4) to energize zero cut-off relay RZCO, this operation only being possible if the weigh hopper 23 has been properly discharged. Should some material remain in the hopper as by adhering to the walls thereof; the zero cut-off indicator 31 will not return to its zero position and the cycle will not proceed until the error has been rectified. Since the likelihood of this happening is very small, no provision has been made for automatic rectification. It would be necessary for an operator to clear the hopper manually.

Energization of zero cut-off relay RZCO closes contacts RCZO1 and opens contacts RCZO2 a short time later in a like manner to the operation of the weigh cut-off relay RCO. As a result, the latch left relay RLL is energized and latches itself in, closing its contacts LL2 to energize the latch right relay trip LRT. Thus, the latch right relay RLR drops while the latch left relay RLL is latched in.

Contacts RZCO1 which are closed by energization of the zero cut-off relay RZCO also serve to energize a zero step-over relay RZSO with self-holding contacts RZSO1.

Dropping of the latch right relay RLR serves to open contacts LR2 which open the circuit holding the discharging relay RD energized. As well as serving to open its own holding contacts RD2, this de-energization of relay RD has the effect of reclosing contacts RD1 in readiness for re-energization of the weigh fast relay RWF during the next cycle. It also opens contacts RD3 to de-energize the discharge solenoid DS so that the four-way air valve 56 is returned by spring action to the position in which it powers the air cylinder 25 to move the doors 24 of the weigh hopper 23 to closed position. Limit switch DGLS associated with these doors then closes, and, since the latch left relay RLL is now latched in with its associated contacts LL1 closed, everything is in readiness for the weigh fast relay RWF to be re-energized by closure of the start switch 44 to initiate another cycle.

Switch 42 enables the whole cycle to be changed over to manual operation by moving the switch to its downward position, while switches 46 and 54 can be similarly and respectively used to cause manual weighing and manual discharging of the weighed material. A manually reset left switch 57 is provided for energizing the latch left relay RLL manually at the beginning of operations, if it was not left latched in from previous working, as it normally would be. The weigh fast auxiliary relay RWFA is provided with a pair of normally open contacts RWFA1 (FIGURE 5c) which close at the start of the weighing operation, and a pair of normally closed contacts RWFA (FIGURE 5d) which open at the start of the weighing operation. These two pairs of contacts are employed for signalling the condition of the cycle to other apparatus such as the baling machine. Yet another pair of contacts RZSO2 associated with the zero step-over relay RZSO close when such relay is energized to signal that the weigh hopper 23 has properly emptied.

FIGURE 6 shows the lower part of FIGURE 4 modified to achieve an additional effect. Weigh solenoid WS is now operated by normally closed contacts RWS2 of the weigh slow relay, so that, during the early part of the cycle, solenoid WS will be energized to actuate four-way valve 53 to hold the hopper doors 21 open by cylinder 22. When mercury switch MM1 is closed, as the weight of material in the hopper 23 attains nearly the desired value, relay RWS is energized to open contacts RWS2 and de-energize weigh solenoid WS to allow valve 53 to turn and reverse the supply of air to cylinder 22. Hence doors 21 begin to close. Whereas, in the circuit of FIGURE 4, this action awaited the signal from mercury switch MM2 that full weight had been achieved, it now takes place at the preliminary stage when nearly full weight has been achieved.

The cylinder 22 is fitted with an adjustable limit switch shown diagrammatically at 58, which is closed by partial closing of doors 21. When switch 58 is closed it completes a circuit through the now closed contacts RWF2 of relay RWF to a valve solenoid VS which is mechanically connected to a three-way valve 59. Energization of solenoid VS turns valve 59 through 90° (anticlockwise as shown) to equalize the pressure on both ends of cylinder 22. The doors 21 are thus stopped in a half closed condition, or, more accurately, a partially closed condition, since in practice the doors 21 will normally be allowed to move almost to their fully closed position before limit switch 58 is operated.

The purpose of this preliminary partial closing of the supply hopper doors 21 is to check the passage of any large lumps of material which might weigh more than the difference between the weight when switch MM1 is closed and the desired final weight. By narrowing the passage through doors 21 so that only small pellets can pass through, this risk is avoided. Any lumps remains in the supply hopper and form part of the next batch of material. Lumps received in the weigh hopper 23 during the early stages of a weighing operation are no disadvantage, as they cannot critically effect the final weight determination.

When the full correct weight is achieved relay RWF is de-energized, as before, to de-energize valve solenoid VS and allow valve 59 to return under spring pressure to the position shown. Since relay RWS is still energized, the valve 53 is still in the position shown, and hence the closing movement of doors 21 is resumed and completed. The remainder of the cycle is then the same as already described in connection with FIGURES 4 and 5.

We claim:
1. Apparatus for weighing batches of particulate material comprising
    (a) a weight hopper,
    (b) scale means supporting the weigh hopper for determining the weight of material therein,
    (c) a supply hopper fitted with bottom door means situated above the weigh hopper,
    (d) door operating means for opening and closing said door means,
    (e) feeding means for feeding material into the supply hopper selectively at a fast or slow rate,
    (f) cycle initiating means connected to said door operating means for opening said door means and connected to the feeding means for actuating the latter at fast rate,
    (g) first means associated with the scale means for sensing a first predetermined weight of material in the weigh hopper,
    (h) second means associated with the scale means for sensing a second predetermined weight of material in the weigh hopper, said second weight being greater than said first weight,
    (i) said first means being connected to the feeding means to initiate feeding at slow rate on sensing said first weight of material in the weigh hopper,
    (j) said second means being connected to said door operating means for closing said door means and connected to the feeding means to stop feeding thereof on sensing said second weight of material in the weigh hopper,
    (k) and means for emptying the weigh hopper.
2. Apparatus according to claim 1, including
    (a) third means associated with the scale means for sensing zero weight of material in the weigh hopper,
    (b) said third means being connected to said cycle initiating means for rendering the latter inoperative in the absence of a sensing of zero weight of material in the weigh hopper by said third means.
3. Apparatus according to claim 1, wherein said means for emptying the weigh hopper include
    (a) bottom door means on said hopper,

(b) and means sensitive to an open condition of said weigh hopper door means connected to said cycle initiating means for rendering the latter inoperative except when said weigh hopper door means is closed.

4. Apparatus according to claim 1, including
(a) means sensitive to an open condition of said supply hopper door means,
(b) said sensitive means being connected to said means for emptying the weigh hopper to render the latter inoperative except when said supply hopper door means is closed.

5. Apparatus according to claim 1, wherein
(a) said first means is connected to said door operating means for initiating closing movement of said door means on sensing said first weight of material in the weigh hopper, and including
(b) means sensitive to partial closure of said door means for arresting said closing movement,
(c) said second means including means for overriding said sensitive means on sensing said second weight of material in the weigh hopper to comlete closing of said door means, 6. Apparatus according to claim 1, wherein
(a) said scale means includes an indicator movable in response to the weight of material in the weigh hopper,
(b) and said first and second means each comprises
    (i) a mercury switch,
    (ii) means mounting said switch on said scale means,
    (iii) and a permanent magnet mounted on said indicator for movement thereby into position for actuation of said switch in response to a predetermined weight of material in the weigh hopper.

7. Apparatus according to claim 2, wherein
(a) said scale means includes an indicator movable in response to the weight of material in the weigh hopper,
(b) and said third means comprises
    (i) a mercury switch,
    (ii) means mounting said switch on said scale means,
    (iii) and a permanent magnet mounted on said indicator for movement thereby into position for actuation of said switch in response to zero weight of material in the weigh hopper.

References Cited by the Examiner

UNITED STATES PATENTS

| | | | |
|---|---|---|---|
| 864,460 | 8/07 | Ertner et al. | 177—122 |
| 2,151,107 | 3/39 | Howard | 177—121 X |
| 2,258,182 | 10/41 | Howard | 177—120 |
| 2,705,607 | 4/55 | Inglett | 177—1 |
| 2,720,375 | 10/55 | Carter | 177—1 |
| 2,775,425 | 12/56 | Engvall | 177—120 |
| 2,833,506 | 5/58 | Gunderson | 177—120 |
| 2,930,569 | 3/60 | Peterson | 177—120 |

FOREIGN PATENTS 649,657 10/62 Canada.

LEO SMILOW, *Primary Examiner.*